METHOD OF ANNEALING A SELENIUM COATING

Filed Dec. 11, 1947 2 SHEETS--SHEET 1

INVENTORS
CARL E. PETERS and
DAVID W. RAU
BY Roy Eilers
ATTORNEY.

METHOD OF ANNEALING A SELENIUM COATING

Filed Dec. 11, 1947 2 SHEETS—SHEET 2

INVENTOR.
CARL E. PETERS and
BY DAVID W. RAU
Rey Eilers
ATTORNEY.

Patented Nov. 20, 1951

2,575,392

UNITED STATES PATENT OFFICE 2,575,392

METHOD OF ANNEALING A SELENIUM COATING

Carl E. Peters, University City, and David W. Rau, Kirkwood, Mo., assignors to Vickers, Incorporated, a corporation of Michigan Application December 11, 1947, Serial No. 791,108

2 Claims. (Cl. 117—65)

Figure 1:
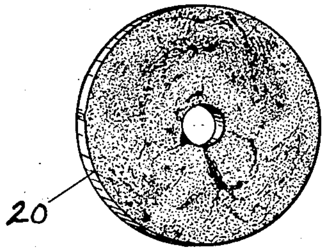

This invention relates to improvements in devices which have selenium as constituent parts thereof. More particularly, this invention relates to an improved method of making electrical devices which have selenium as constituent parts thereof.

It is therefore an object of the present invention to provide an improved method of making electrical devices which have selenium as constituent parts thereof.

In the making of electrical devices which have selenium as constituent parts thereof, it is first necessary to attach and affix the selenium to a supporting surface; and thereafter it is necessary to give the selenium the proper crystalline structure. This is necessary because the amorphous or vitreous state of selenium has high electrical resistivity; and such high electrical resistivity would impair the use, and limit the applications of, the electrical devices containing selenium . The gray crystalline form, to which the selenium can be converted, has a lesser electrical resistivity; and that lesser electrical resistivity permits the electrical devices containing the selenium to be used as photo-electric cells and electrical rectifiers. Where the devices containing selenium are to be used as photo-electric cells or rectifiers, it is desirable to increase the conductivity of the selenium in the "forward" direction; and where those devices are to be used as rectifiers it is desirable to increase their resistance in the "inverse" direction. In those instances where this is done, the devices have the desired electrical characteristics.

In making such devices it has been found beneficial to attach the selenium to its supporting plate in the form of a thin coating, and then to heat-treat that coating. Where the heat-treating of the coating took the form of an annealing operation, it was found that the operating characteristics of the devices containing selenium were improved by the heat treatment. Prior annealing operations were carried out at temperatures below the melting point of gray crystalline selenium; it being felt that temperatures at or above the melting point of gray crystalline selenium would convert the gray crystalline form of selenium to the vitreous or amorphous form. The exact temperature at which gray crystalline selenium melts is somewhat in doubt; the Handbook of Chemistry and Physics published by the Chemical Rubber Company stating that the melting point of gray crystalline selenium is two hundred and seventeen (217) degrees centigrade, and a prior patent stating that the melting point of gray crystalline selenium is two hundred and eighteen (218) degrees centigrade. However, irrespective of which temperature was believed to be the melting point of gray crystalline selenium, it was the practice to anneal the selenium below that melting point temperature. Such treatment of the selenium coating served to convert any residual vitreous or amorphous selenium to the gray crystalline state, and it caused a growth of crystal nuclei which increased the overall electrical efficiency of the electrical devices containing selenium.

The present invention provides a heat treatment for the selenium coating, of articles containing selenium, which differs from the heat treatment customarily given to such coatings. The heat treatment of the present invention maintains the temperature of the selenium coating at or above the melting point of gray crystalline selenium for a short period of time, instead of maintaining the temperature of that coating below the melting point of gray crystalline selenium. By doing so, the present invention materially enhances the desirable electrical characteristics of the devices containing selenium; and it does so without any decrease in conductivity in the "forward" direction. For example, in electrical rectifiers where it is desirable to increase the resistance in the "inverse" direction to a maximum while keeping the resistance in the "forward" direction at a minimum, it is possible, by using the principles and teachings of the present invention, to increase the resistance in the "inverse" direction as much as fifty percent (50%) without appreciably increasing the resistance in the "forward" direction. This naturally results in a great increase in the efficiency and value of the rectifiers. It is therefore an object of the present invention to provide a method of treating devices containing selenium which will increase the resistance of those devices in the "inverse" direction without causing an appreciable increase in the resistance of those devices in the "forward" direction.

The present invention attains this exceedingly desirable result by maintaining the temperature of the heat-treating oven within extremely close limits, by maintaining that temperature at or above the melting point of gray crystalline selenium, and by making the annealing time quite short. Where this is done, the selenium coatings will not melt in their entirety; instead, some of the nuclei of the selenium crystals will remain unchanged while limited portions of the crystals on the surface of the coatings will tend to melt and merge together. These limited portions, which probably include the grain boundaries of adjacent crystals, will tend to form new crystals when the coatings are removed from the heat-treating oven. However, the crystals which form, as the molten selenium from the limited portions of the original crystals cools, need not be the original crystals of the coatings; instead they can, and usually will, be new crystals. Expressed differently, heat-treating selenium coatings at temperatures below the melting point of gray crystalline selenium will cause the growth of the original crystal nuclei, while heat-treating selenium coatings at temperatures which are at or above the melting point of gray crystalline selenium can cause the formation of crystals about the original crystal nuclei and can also cause the formation of additional crystals between those nuclei. These additional crystals tend to make the size of the crystals at the surfaces of the coatings more uniform, and to greatly increase the resistance of the coatings in the "inverse" direction while keeping the resistance in the "forward" direction at a low value.

An appreciable amount of control can be obtained over the size of the crystals of selenium at the surfaces of the coatings by regulating the rate at which the coatings are permitted to cool. Where the coatings are cooled quite rapidly the crystals will be rather small, but where the coatings are cooled quite slowly the crystals will be larger. This same effect occurs to some extent where the heat-treating temperature is below the melting point of gray crystalline selenium; but this effect is tremendously more pronounced where the heat-treating temperature is at or above the melting point of gray crystalline selenium, because parts of the surfaces of the coatings of selenium coating melt. In the former case the rate at which the original crystal nuclei can be made to grow can be controlled, but there is no possibility of reducing the size of the original crystal nuclei and there is but little possibility of forming new crystal nuclei. In the latter case, the size of the original crystal nuclei can be increased or reduced, and new crystal nuclei can be formed. As a result, the heat-treating method of the present invention provides control over the size and arrangement of crystals which was heretofore believed to be impossible.

Other and further objects and advantages of the present invention shall become apparent from an examination of the drawing and accompanying description.

In the drawing and accompanying description a preferred manifestation of the present invention is shown and described but it is to be understood that the drawing and accompanying description are for the purposes of illustration only and do not limit the invention, and that the invention will be defined by the appended claims.

Figure 2:
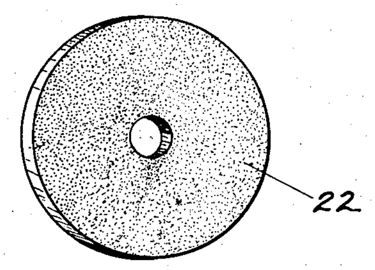
Figure 3:
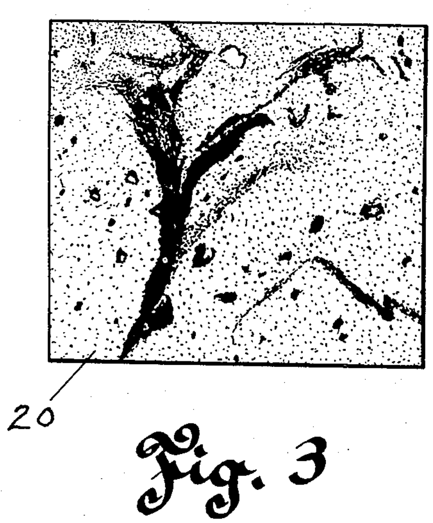
Figure 4:
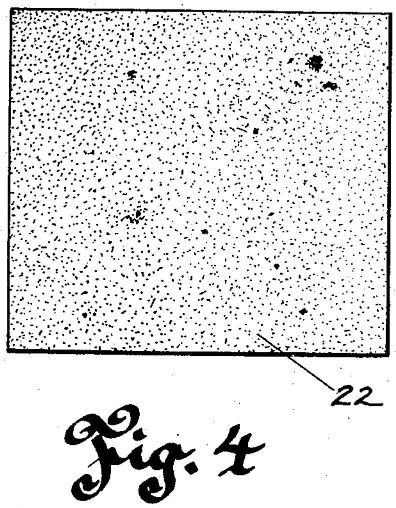
Figure 5:
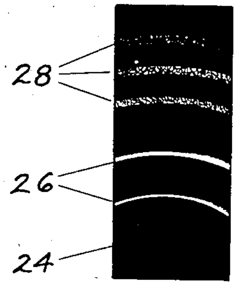
Figure 6:
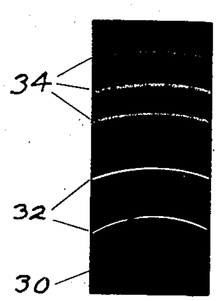
Figure 7:
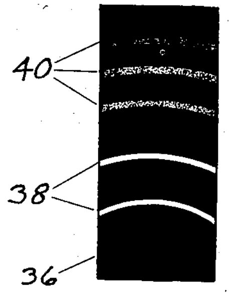
Figure 8:
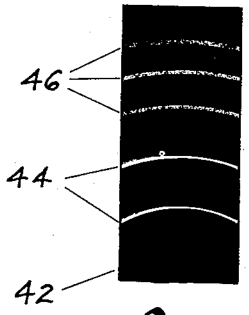
Figure 9:
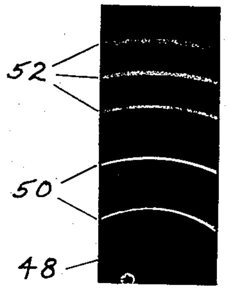
Figure 10:
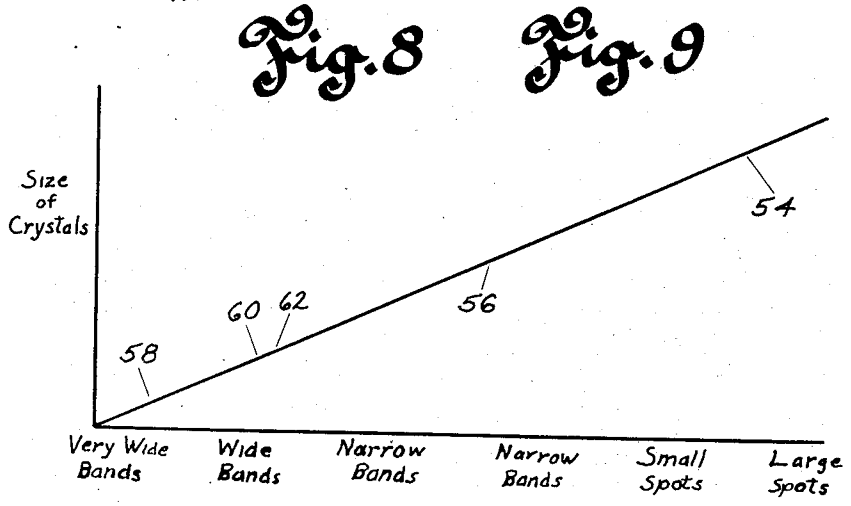

In the drawing, Fig. 1 is a representation of a photograph which was made of a selenium-coated supporting plate that had been given a heat treatment at temperatures below the melting point of gray crystalline selenium, Fig. 2 is a representation of a photograph which was made of a selenium-coated supporting plate that is similar to the supporting plate of Fig. 1 but differs from that plate in that it was given a heat treatment at temperatures above the melting point of gray crystalline selenium, Fig. 3 is a representation of a magnified photograph of a portion of the surface of the supporting plate of Fig. 1, Fig. 4 is a representation of a magnified photograph of a portion of the surface of the supporting plate of Fig. 2, Fig. 5 is a representation of an X-ray photograph that shows X-ray diffraction patterns obtained from the surface of a selenium-coated supporting plate which was heat treated at temperatures below the melting point of gray crystalline selenium, Fig. 6 is a representation of an X-ray photograph that shows X-ray diffraction patterns obtained from the surface of a selenium-coated supporting plate which was heat-treated at temperatures above the melting point of gray crystalline selenium, Fig. 7 is a representation of an X-ray photograph that shows X-ray diffraction patterns obtained from the surface of a selenium-coated supporting plate which was heated to temperatures above the melting point of gray crystalline selenium, quenched in water, and then abraded to remove its outer surface, Fig. 8 is a representation of an X-ray photograph that shows X-ray diffraction patterns obtained from the surface of a selenium-coated supporting plate which was heated to temperatures above the melting point of gray crystalline selenium and then quenched in water, Fig. 9 is a representation of an X-ray photograph that shows X-ray diffraction patterns obtained from the surface of a selenium-coated supporting plate which was removed from the "forming" press and permitted to cool, and Fig. 10 is a graph which illustrates the relation between the size of the crystals on the plates and the patterns obtained on the X-ray photographs.

Referring to the drawing in detail the numeral 20 denotes a representation of a selenium-coated supporting plate. This figure is a copy of an actual photograph taken of a completed plate. That plate was made by selecting a supporting plate of the desired material, as for example nickel or steel or another metal which is coated with nickel, heating that supporting plate until it is at a temperature considerably above the melting point of selenium, rubbing a stick of vitreous selenium against the heated plate, pressing the plate in a "forming" press, and heat-treating the plate. When the stick of vitreous selenium was rubbed against the heated surface of the supporting plate, the selenium melted and ran onto the supporting plate. Every care was taken to attain a coating of uniform thickness and to attain a uniform distribution of the selenium on the surface of the supporting plate. However, the mechanical working of the selenium, as it was being applied to the supporting plate, tended to form zones on the surface of the supporting plate wherein the crystallization of the selenium was not uniform; and in addition, variations in the thickness of the coating did occur. The variations in thickness, and the formation of zones of different crystallization, are not unusual in selenium-coated supporting plates that are formed by rubbing a stick of selenium against a heated supporting plate. The variations in thickness of the selenium coating can be eliminated by placing the supporting plate, with its coating of vitreous selenium, in the "forming" press; the heat and pressure of this press being sufficient to cause the selenium to flow, although the temperature is considerably below the melting point of gray crystalline selenium, and also being sufficient to cause much of the vitreous or amorphous selenium to convert to the gray crystalline form. The pressing step did eliminate the variations in thickness, but it did not eliminate the zones of different crystallization. In fact, those zones which are usually invisible at the conclusion of the coating step, are usually made visible during the pressing step; and they form swirl patterns. The conversion to the gray crystalline form which occurred in the pressing step, also did not eliminate the swirl pattern. After its removal from the "forming" press, the coated plate was held in an atmosphere of two hundred and fourteen (214) degrees centigrade for forty-five (45) minutes. This treatment served to convert all residual amorphous or vitreous selenium to the gray crystalline form, but it could not eliminate the swirl patterns. Instead, the best treatment tended to accentuate the swirl pattern by causing further growth of the crystals of selenium, which further growth gave the strikingly non uniform surface shown in Figs. 1 and 3. The temperature of two hundred and fourteen (214) degrees centigrade was selected as being typical of the temperatures used in prior heat treatments for selenium-coated supporting plates; and thus it is evident that prior heat treatments enhance, rather than eliminate, swirl patterns.

In Fig. 2, the numeral 22 denotes a representation of a selenium-coated supporting plate. This figure is a copy of an actual photograph of a plate which was formed in substantially the same way the plate 20 of Fig. 1 was formed. A supporting plate of suitable metal was heated to temperatures considerably above the melting point of selenium, a stick of vitreous selenium was rubbed against that heated plate until the selenium melted and ran onto the plate 22, the coated plate was then placed in a "forming" press, and heated and pressed until it had a thin uniform-thickness coating of selenium thereon. However, the coated plate was not heat-treated in the way the plate 20 of Fig. 1 was treated. Instead, the plate 22 was heated to a temperature of two hundred and nineteen (219) degrees centigrade for seven (7) minutes. During that heat treatment the swirl pattern, which had appeared during the pressing step and which was practically identical to the swirl pattern of plate 20 of Fig. 1, disappeared almost completely. In addition, the surface of the plate 22 of Fig. 2 was given a more uniform appearance than the plate 20 of Fig. 1 received. This was due to the melting of certain portions of the selenium crystals on the surface of the plate and the subsequent recrystallization of those portions 59 when the plate 22 was removed from the heat treating chamber. The recrystallization not only eliminated the swirl pattern but it also made the crystals on the surface of plate 22 more uniform.

These changes are emphasized particularly in Figs. 3 and 4. Those figures are representations of actual photographs which were taken at a magnification which is six (6) times that of the photographs from which Figs. 1 and 2 were made. Fig. 3 shows in considerable detail the nature and character of the swirl pattern in the selenium-coated plate 20, and Fig. 4 shows how completely that pattern was eliminated from the selenium-coated plate 22.

The fundamental difference between the methods used in heat treating the coated plates 20 and 22 lies in the use, for plate 22, of temperatures above the melting point of gray crystalline selenium. The heat treatment that is customarily used in the prior art, and was used with plate 20, employs temperatures below the melting point of gray crystalline selenium and it cannot reduce the size of the crystal nuclei which were formed in the "forming" press. Instead, that heat treatment can only cause further growth of those crystal nuclei. The novel heat treatment which is provided by the present invention, and which was used with plate 22, differs from the prior heat treatment because it can increase or decrease the size of the crystal nuclei formed in the "forming" press, and it can also form new crystal nuclei. With the heat treatment provided by the present invention, part of the surface of the selenium-coated supporting plate melts; and this melting acts to initially reduce the size of the original crystal nuclei and to affect the grain boundaries of those crystal nuclei. This melting permits subsequent recrystallization of the molten selenium; and as a result the selenium coating on the supporting plate will have newly formed crystals between the original crystal nuclei, and the original crystal nuclei will be changed in size. This provides a more uniform size of crystals on the surface of the selenium coating, and it makes the distribution of the crystals more uniform; and this has been found to result in an increase of resistance in the "inverse" direction of as much as fifty percent (50%) without materially affecting the resistance in the "forward" direction. A change of this magnitude materially increases the efficiency and value of rectifiers made from selenium coated supporting plates. Consequently, the heat treating method of the present invention is far superior to prior treating methods.

In addition to the described method of applying selenium by rubbing a stick of selenium against the heated supporting plate, there are two other well-recognized methods of applying selenium to supporting plates. One of those methods includes pressing powdered selenium into contact with a heated or unheated supporting plate until that powder adheres to that plate, and the other of those two methods includes evaporating selenium and causing it to condense onto a supporting plate. The first of those two methods is more desirable than the second of the two methods from the standpoint of cost and simplicity of manufacture; but both of the methods need heat treatment. The selenium coated supporting plates, which are made by pressing powdered selenium against the heated supporting plate, need the heat treatment to make crystals of the desired size on the surface of the plate and also to eliminate any flow lines created during the pressing step. The plates which are made by pressing powdered selenium into the surface of a supporting plate and the selenium-coated supporting plates which are made by evaporating and condensing selenium thereon, need the heat treatment to form crystals of the desired size on the surface of the plate and to unite and connect the discrete selenium particles on the surface of the plate. In heat treatments carried on at temperatures below the melting point of gray crystalline selenium, it is not possible to eliminate the flow lines on the selenium surface and it is not possible to unite and connect the individual, discrete particles of selenium in the surface of the supporting plates. This can only be done by the heat treating method of the present invention. This and other effects of the heat treatment of the present invention are indicated in Figs. 5–9.

Fig. 5 is a representation of an X-ray photograph that shows X-ray diffraction patterns obtained from the surface of a selenium-coated supporting plate which was heat treated at temperatures below the melting point of gray crystalline selenium. This coated plate was formed by initially heating a base plate to temperatures in the neighborhood of three hundred and seventy (370) degrees centigrade, sprinkling a thin layer of powdered selenium onto the heated plate, cooling the plate, sprinkling a second layer of powdered selenium onto the plate, placing the plate in a "forming" press, and then heat treating the coated plate. The initial layer of powdered selenium immediately melted, some of it forming a selenide with the metal of the supporting surface, and the rest of the selenium forming a thin vitreous or amorphous selenium layer on top of the selenide. As it cooled, the selenium remained in the vitreous or amorphous state, and the second layer of powdered selenium was applied directly to that first layer. In the "forming" press, a pressure of about three hundred and fifty (350) pounds per square inch and a temperature of about one hundred and thirty (130) degrees centigrade was applied to the coated plate; and that pressure and temperature caused the two layers to unite and to convert to gray crystalline selenium. After its formation in the press, the coated plate was heated to a temperature of two hundred and fourteen (214) degrees centigrade for a period of approximately forty-five (45) minutes. At the conclusion of this heat treatment, the coated plate was allowed to cool to room temperature; and thereafter it was mounted in an X-ray diffraction camera. The X-rays were projected along the surface of the selenium-coated base plate at a grazing angle, and the X-ray diffraction pattern was recorded on a negative. A positive was made from the negative, and a representation of that positive is shown in Fig. 5; and it is denoted by the numeral 24. Large spots are shown in the outer bands 28 of the positive, and the inner bands 26 of the positive are of average size. The large spots in the outer bands 28 of positive 24 show that the crystals formed on the surface of the coated plate are large in size and are discrete in character. Such crystals are at the right hand side of the chart in Fig. 10; and they are in the range of one one hundredth (0.01) of a millimeter in diameter. As a result the surface of the plate is composed of a number of large, individual crystals.

Fig. 6 is a representation 30 of an X-ray photograph that shows X-ray diffraction patterns obtained from the surface of a selenium-coated supporting plate which was heat treated at temperatures above the melting point of gray crystalline selenium. This supporting plate was formed in the same manner as the supporting plate of Fig. 5 was formed, but it was heat treated at two hundred nineteen (219) degrees centigrade for seven (7) minutes. This temperature is definitely above the melting point of gray crystalline selenium; and during the heat treatment, limited portions of the original crystal nuclei melted. In particular, the grain boundaries of the original crystal nuclei melted; and upon cooling, the coated plate was found to have new crystals in the areas formerly occupied by the grain boundaries of the original crystal nuclei. In addition, it was found that the size of the original crystal nuclei had decreased. This is the exact reverse of the action experienced in all prior annealing operations with selenium-coated supporting plates, because the prior annealing operations caused the original crystal nuclei to grow. The small size of the crystals on the surface of the supporting plate is shown by the narrowness of the inner and outer bands 32 and 34 of Fig. 6. As indicated in the chart of Fig. 10, crystals which form narrow bands on X-ray diffraction photographs are smaller than crystals which provide large spots in the outer bands. The crystals which cause the formation of narrow bands on the X-ray photograph are in the range of from two ten-thousandths (0.0002) to five one-thousandths (0.005) of a millimeter in diameter. Obviously the crystals formed by the heat treatment of the present invention are much smaller than the crystals formed by prior heat treatments.

In further proof of the effect which high temperature heat treatments have on selenium coatings, the plates represented in Figs. 7, 8 and 9 were made and photographed. Each of the plates was made by initially heating a base plate, sprinkling a thin layer of powdered selenium onto the heated plate, cooling the plate, sprinkling a second layer of powdered selenium onto the plate, and placing the plate in a "forming" press. At such time, each of the plates had the crystal structure indicated in Fig. 9. It will be noted that the bands 50 and 52 on representation 48 in that figure are in the wide range of Fig. 10, thus indicating that the crystals are smaller than the crystals obtained in Fig. 5 by the heat treatment below the melting point of gray crystalline selenium, and are also smaller than the crystals obtained in Fig. 6 by the heat treatment above the melting point of gray crystalline selenium. This proves that one of the eventual results of the heat treatment of selenium is an increase in the size of the crystals.

The plate represented in Fig. 8 was removed from the press, at which time it had the crystal structure indicated in Fig. 9, was heated to a temperature above the melting point of gray crystalline selenium, and was then quickly quenched in water. The resulting crystals, as indicated by the width of bands 44 and 46 on representation 42, were of about the same size as those on the plate of Fig. 9; indicating that the growth of crystals, which occurred in the high temperature process used with the plate of Fig. 6, occurred as the plate cooled and did not occur while the plate was being heated.

Fig. 7 is a representation 36 of an X-ray photograph that shows X-ray diffraction patterns obtained from a selenium-coated supporting plate which was heated to temperatures above the melting point of selenium, was quickly quenched in water, and then had its surface removed by abrading. This procedure was followed to ascertain the character and nature of the selenium below the surface of the selenium coating on the plate, and the great width of the bands 38 and 40 on representation 36 indicates that the selenium crystals are very small, even smaller than the crystals found in plates removed from the press. This proves that the high temperature treatment initially reduces the size of the crystals, and then permits growth of the original crystals plus new crystals.

The difference between the quenched crystals of Figs. 7 and 8 may be due to the fact that the smaller crystals start to form at the surface of the supporting plate or it may be due to the fact that some recrystallization occurred in the brief time the plate was being moved to the quenching bath. In any event, Figs. 7–9 show positively that the high temperature heat treatment can reduce, as well as increase, the size of the selenium crystals. In contrast, prior heat treatments can only cause growth of the original crystal nuclei. By being able to modify and change the original crystal nuclei, the heat treatment of the present invention provides a crystal structure that is new and different and directly contributes to the amazing increase in the desired electrical properties of selenium-coated plates.

In providing the heat treatment of the present invention, it is necessary to raise the temperature of the heat treating chamber to a level above the melting point of gray crystalline selenium; and it is desirable to maintain that temperature within limits of plus or minus two tenths (0.2) of a degree centigrade. Moreover, the temperatures usable in the heat treatment should be within the range of two hundred and eighteen (218) degrees centigrade to two hundred nineteen and seven tenths (219.7) degrees centigrade. Where this range of temperatures is employed, the temperature in the heat treating chamber will be at or above the melting point of gray crystalline selenium, whether a temperature of two hundred and seventeen (217) or a temperature of two hundred and eighteen (218) degrees centigrade is regarded as the melting point of gray crystalline selenium. Once the temperature of the heat treating chamber has been raised to the desired level, the selenium-coated supporting plate is placed in that chamber for a period of time which is long enough to melt part of the selenium but is short enough to keep all of the selenium from melting. At temperatures between two hundred eighteen and seventy-five one-hundredths (218.75) and two hundred nineteen and twenty-five one-hundredths (219.25) degrees centigrade, the preferred range for heat treatment, that time will be from five (5) to nine (9) minutes.

Where the temperature, and the time during which the selenium-coated supporting plate is heated, are correlated in this manner there is no tendency for the entire selenium layer to melt. Moreover, there is no tendency of the selenium layer to lose the smooth surface and thickness obtained in the "forming" press. Instead, it is principally the grain boundaries of the crystals which tend to melt; and the major portions of the crystals do not melt, but instead retain their crystalline character throughout the heat treatment. Upon removal of the heat treated, selenium coated supporting plates from the heat treating chamber, the surfaces of those plates have a dark color; and that color changes, within a matter of seconds after the plates are contacted by the cooler ambient air surrounding the chamber, to the gray color associated with crystalline selenium. This confirms the results indicated by the X-ray photographs, since it proves that the heat treating method of the present invention causes partial melting of the selenium coating and thereby changes and modifies the original crystals, as by melting limited portions of those crystals. The portions which melt remain in the molten state until the supporting plates are removed from the heat treating chamber, thus causing the dark color noted in the plates. Thereafter, new or modified crystals are formed, thus restoring the gray color. These new or modified crystals serve to provide a surface which has crystals of small size that are distributed uniformly across the areas of the plates. No longer does the surface have large discrete particles; instead it has a continuous surface formed of small selenium crystals.

A further illustration of the contrast between the action which occurs at temperatures above the melting point of selenium and the action which occurs below the melting point of selenium was obtained by grinding gray crystalline selenium into the form of powder, placing the powder on identical supporting plates, and heat treating one of the plates at two hundred and fourteen (214) degrees centigrade while heat treating the other plate at two hundred nineteen (219) degrees centigrade. When the plates were placed in the heat treating chambers the powder consisted of individual discrete particles. The plate which was heat treated at two hundred and nineteen (219) degrees centigrade came out with a continuous surface of integrated particles; the edges or boundaries of the individual powder particles having melted and begun to adhere to the supporting plate and to each other. The plate which was heat treated at two hundred and fourteen (214) degrees centigrade retained its original form, and the discrete particles never united with each other or with the supporting plate.

One very important advantage of the method provided by the present invention is the attainment of increased electrical efficiency. Another important advantage is the attainment of a shorter time required to make the completed selenium coated, supporting plate. By having the temperatures in the annealing process above the melting point of gray crystalline selenium, it is possible to reduce the annealing time to as little as ten (10) minutes or less. This is of great value in speeding up the process of making selenium coated supporting plates; and it makes possible the forming of selenium-coated plates by production-line methods.

One preferred method of practicing the present invention includes selecting a supporting plate of the iron group, as for example iron or nickel or another metal which is coated with nickel, heating the supporting plate to a temperature in the neighborhood of three hundred and seventy (370) degrees centigrade, placing a thin layer of powdered selenium on the heated supporting plate and thus forming a selenide coating and a thin layer of vitreous selenium on the supporting plate, cooling the selenium-coated plate, placing a second layer of selenium powder on the supporting plate, introducing the powder covered, supporting plate into a press, and heating the plate to temperatures in the neighborhood of one hundred and thirty (130) degrees centigrade while holding that plate under pressures of approximately three hundred and fifty (350) pounds per square inch. This plate, which will have been formed in accordance with the principles and teachings of the invention disclosed and claimed in our copending patent application (now abandoned) that was filed May 5, 1947, bears Serial No. 746,164 and is entitled "Devices Which Have Selenium as Constituent Parts Thereof," will have selenium crystals on the surface thereof. That plate is then placed in a heat treating chamber wherein the temperature is held within plus or minus two tenths (0.2) of a degree of a temperature of two hundred and nineteen (219) degrees centigrade.

The plate is kept in that chamber for seven (7) minutes; and upon withdrawal from that chamber the plate will have a rather dark surface which will perceptibly lighten to the gray color associated with crystalline selenium. The plate is then permitted, during a period of three (3) minutes, to cool to a temperature below one hundred and fifty (150) degrees centigrade; and once the temperature of the plate is below one hundred and fifty (150) degrees centigrade, all further growth of crystals on the plate ceases. Thereupon the plate is complete, requiring no treatment other than the application of a frontal electrode. Where a plate of this type is used as an electrical rectifier, it can develop an "inverse" voltage of twenty five (25) volts, as contrasted with the sixteen (16) volts developed in the "inverse" direction by plates of similar size and construction which were heat treated at temperatures below the melting point of gray crystalline selenium. The resistance of the rectifiers in both instances were the same in the "forward" direction. This represents a gain in "inverse" resistance of approximately fifty percent (50%) over similar plates without any increase in resistance in the "forward" direction. This is a tremendously valuable improvement in the operating characteristics of the rectifiers.

The method provided by the present invention has an upper temperature limit that cannot be exceeded, except for very short transitional periods. That temperature is two hundred nineteen and seven tenths (219.7) degrees centigrade. At or above this temperature, so much of the selenium coating is melted in the heat treating process that the coating will not reconvert to the crystalline form on cooling. Instead becomes largely amorphous or vitreous selenium. Accordingly, the temperatures in the heat treating cycle must be at or above the melting point of selenium and yet be below a temperature of two hundred nineteen and seven tenths (219.7) degrees centigrade. Moreover the cycle must be limited in point of time, since if continued indefinitely the process would melt the entire coating. Generally a period of five (5) to ten (10) minutes is optimum for the attainment of partial melting of the crystals folowed by reconversion to the crystalline state.

In the heat treating process, temperature of two hundred and eighteen (218) to two hundred nineteen and seven tenths (219.7) degrees centigrade can be used. However, it is most satisfactory to use temperatures in the range of two hundred eighteen and seventy five one hundredths (218.75) to two hundred nineteen and twenty five one hundredths (219.25) degrees centigrade. In each case where the temperature of the heat treating step is at or above the melting point of gray crystalline selenium, some melting of the crystals occurs. That melting is followed by a recrystallization of the molten portions; and that recrystallization provides a minimum of cracks, fissures, and other discontinuities in the surface of the plate.

The rate of cooling has some effect on the size of the crystals on the surface. Quenching of the plates as they are removed from the oven will prevent further growth of the crystals; and slow cooling of the plates will permit additional growth of the crystals. In any event, cooling of the plates below one hundred and fifty (150) degrees centigrade will halt further crystal growth.

In Fig. 10 the relative size of the crystals, on the plates represented in Figs. 5–9, is shown. The numeral 54 indicates the approximate point on the inclined line which is representative of the crystals of Fig. 5. The numeral 56 represents the crystals of Fig. 6, numeral 58 represents the crystals of Fig. 7, numeral 60 represents the crystals of Fig. 8, and numeral 62 represents the crystals of Fig. 9.

Whereas the drawing and accompanying description have shown and described a preferred manifestation of the present invention, it should be obvious to those skilled in the art that various changes can be made in the manifestation of the invention without affecting the scope thereof.

What I claim is:

1. The method of annealing a coating of selenium to render the size of the selenium crystals in said coating more uniform, as by reducing the size of larger crystals, that comprises heating said selenium coating above the melting point of selenium to a temperature between two hundred eighteen degrees centigrade and two hundred nineteen and seven tenths degrees centigrade, maintaining said selenium coating at said temperature for a period of from nine to five minutes, and cooling said selenium coating to provide re-crystallization of the melted portions of said selenium coating.

2. The method of annealing a coating of selenium to render the size of the selenium crystals in said coating more uniform, as by reducing the size of larger crystals, that comprises heating said selenium coating above the melting point of selenium to a temperature between two hundred eighteen degrees centigrade and two hundred nineteen seven tenths degrees centigrade, maintaining said selenium coating at said temperature for a period of time sufficient to provide melting of limited portions of the surface crystals in said selenium coating without causing melting of all portions of said selenium coating, and cooling said selenium coating to provide re-crystallization of the melted portions of said selenium coating.

CARL E. PETERS.
DAVID W. RAU.

REFERENCES CITED

The following references are of record in the file of this patent:

UNITED STATES PATENTS

| Number | Name | Date |
|---|---|---|
| 2,307,474 | Thompson | Jan. 5, 1943 |
| 2,364,642 | Miller | Dec. 12, 1944 |
| 2,413,013 | Von Hippel | Dec. 24, 1946 |